United States Patent [19]

Veith

[11] Patent Number: 4,564,790

[45] Date of Patent: Jan. 14, 1986

[54] FLAT ELECTRON BEAM TUBE HAVING A GAS DISCHARGE AS ELECTRON SOURCE

[75] Inventor: Werner Veith, Heidelberg, Fed. Rep. of Germany

[73] Assignee: Siemens Aktiengesellschaft, Berlin and Munich, Fed. Rep. of Germany

[21] Appl. No.: 505,308

[22] Filed: Jun. 17, 1983

[30] Foreign Application Priority Data

Jun. 18, 1982 [DE] Fed. Rep. of Germany ....... 3222850

[51] Int. Cl.[4] ........................ H04N 3/16; H05B 37/00

[52] U.S. Cl. ................................ 315/169.4; 313/422; 313/584

[58] Field of Search ........................ 315/169.4, 58, 59; 313/484, 485, 422, 584, 585

[56] References Cited

U.S. PATENT DOCUMENTS

| | | | |
|---|---|---|---|
| 3,956,667 | 5/1976 | Veith | 315/58 X |
| 4,236,096 | 11/1980 | Tieman | 313/1 |
| 4,322,657 | 3/1982 | Veith et al. | 313/485 |
| 4,328,444 | 5/1982 | Littwin | 313/422 |
| 4,376,258 | 3/1983 | Glock | 313/422 |

FOREIGN PATENT DOCUMENTS

| | | |
|---|---|---|
| 2615569 | 10/1977 | Fed. Rep. of Germany . |
| 2643915 | 3/1978 | Fed. Rep. of Germany . |
| 2656621 | 6/1978 | Fed. Rep. of Germany . |
| 2855056 | 7/1980 | Fed. Rep. of Germany . |
| 2412869 | 10/1980 | Fed. Rep. of Germany . |
| 3010179 | 9/1981 | Fed. Rep. of Germany . |

*Primary Examiner*—David K. Moore

*Attorney, Agent, or Firm*—Herbert L. Lerner; Laurence A. Greenberg

[57] ABSTRACT

A flat electron beam tube includes a gas-filled enclosure containing two mutually parallel front and rear plates, a control plate subdividing the enclosure and extending, parallel to the front and the rear plates, into a front chamber, a post-acceleration space, and a rear gas discharge space; the rear plate carrying a gas discharge cathode on an inner side thereof; the front plate carrying a luminescent layer excitable by electrons and a post-acceleration anode; the control plate carrying mutually parallel strip-shaped row conductors, and being formed with a number of regularly arranged electron inlet openings and mutually parallel, strip-shaped column conductors, and being formed with a number of regularly arranged electron outlet openings, the column conductors being disposed crosswise to the row conductors, and the electron outlet openings being associated, respectively, by means of cutouts formed in the control plate, with given electron inlet openings; the row conductors being connected successively to a potential more positive than the potential of the gas discharge cathode so that an electron-supplying gas discharge burns between the opposite gas discharge cathode and the connected row conductor; mutually associated electron inlet openings and electron outlet openings being disposed in non-overlapping relationship in a direction perpendicular to the plane of the front and the rear plates; and the column conductors being always at a potential more negative than that of the row conductor being then connected.

7 Claims, 2 Drawing Figures

FLAT ELECTRON BEAM TUBE HAVING A GAS DISCHARGE AS ELECTRON SOURCE

Figure 1:
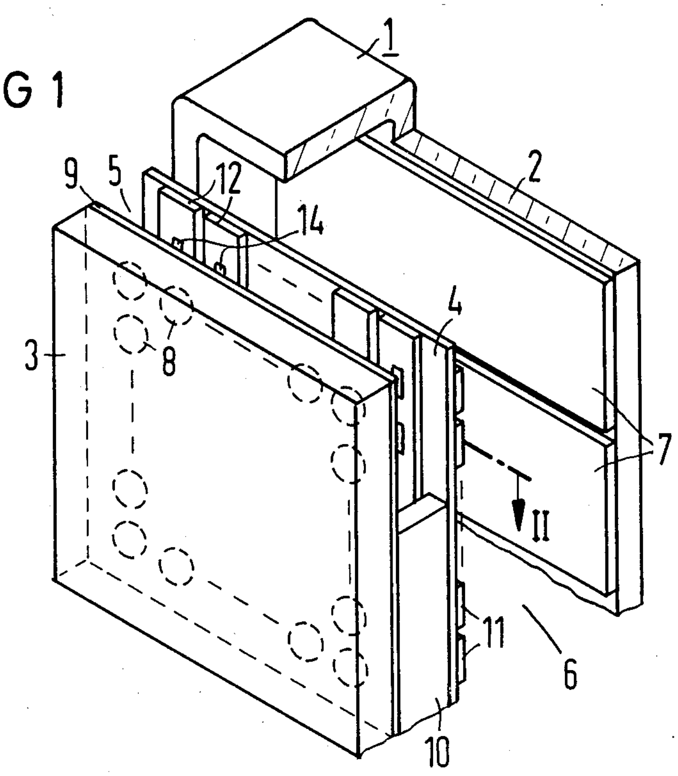

The invention relates to a flat electron beam tube having a gas discharge as electron source and more particularly to such a beam tube which includes a gas-filled enclosure containing two mutually parallel plates, namely a front plate and a rear plate disposed one behind the other in viewing direction; the enclosure having an interior space subdivided by a control plate extending parallel to the planes of the front and the rear plates, into a front chamber; post-acceleration space, and a rear chamber defining a gas discharge space; the rear plate carrying at least one cathode on an inner side thereof, the cathode being a gas discharge cathode; the front plate carrying, on an inner side thereof, a luminescent layer excitable by electrons and a post-acceleration anode; the control plate carrying, on a side thereof facing towards the gas discharge space, a family of mutually parallel strip-shaped row conductors, and being formed with a number of regularly arranged electron inlet openings and, on the side thereof facing towards the post-acceleration space, a family of mutually parallel, strip-shaped column conductors, and being formed with a number of regularly arranged electron outlet openings, the column conductors being disposed crosswise to the row conductors, and the electron outlet opening being associated, respectively, by means of cutouts formed in the control plate, with given electron inlet openings; the row conductors being addressed successively by being connected to a more positive potential relative to the potential of the gas discharge cathode in a manner that an electron-supplying gas discharge burns between the opposite gas discharge cathode and the addressed row conductor; the column conductors being supplied with corresponding signal voltages during the time wherein a given row conductor is addresses; the post-acceleration anode being at a positive potential so high that the electrons traveling from the gas discharge into the post-acceleration space are accelerated to severly kV and finally strike the luminescent layer.

Such a flat picture screen is described, for example, in U.S. Pat. No. 3,956,667 which issued May 11, 1976 and which corresponds to German Pat. No. 24 12 869. Attempts have been made for years to develop an alternative to the classical cathode ray tube in the medium and high-informative field, which requires less overall depth and provides, as much as possible, an even greater picture quality. There heretofore greatest advances have been achieved with a two-chamber plasma panel which works as follows: A flat, gas-filled space is subdivided by an electrode matrix. In a rear part, a more-or-less wedge-shaped gas discharge burns between a large-area cathode on the rear side and a respective one of the matrix lines. From this plasma wedge, electron currents on which the line information is imposed through suitable addressing of the matrix columns is transferred into the forward part. They are post-accelerated there to several kV and finally strike a fluorescent screen. The acceleration distance is selected to be so short, taking into consideration the so-called Paschen law, that, in spite of high energies, the electrons are normally unable to trigger a gas discharge in the front chamber.

This flat display has become developed currently to such an extent already that it furnishes (color) television pictures with entirely acceptable optical qualities in the laboratory. If no material progress has been made beyond the laboratory state, that is due particularly to several plasma-related problems for which no simple and reliable effective remedy has yet been found.

Especially detrimental consequences can flow from the fact that, on occasion, ions are produced in the post-acceleration space. These charge carriers, when striking parts of the vessel, such as the sensitive electrode matrix, for example, sputter away material which may be deposited, in turn, on insulating paths or on the fluorescent screen and may then impair the dielectric strength thereof against high voltage and the light yield thereof, respectively. One must further take into account that the ions will pass into the gas discharge space and there increase the plasma current to such an extent that the tube will break down in this region. A further source of trouble are fast electrons from the gas discharge space which pass through the electrode matrix outside the row or line then being controlled and thereby brighten the picture background. A further contribution to the background brightness perceived by the viewer stems from the (UV) light which is generated in the plasma itself and which can pass unimpeded to the front through the matrix openings. These difficulties have been attacked heretofore relatively early, and attempts have been made to attain the goal through a combination of several measures. Thus, there has been discussion to change the gas with respect to pressure and composition, to subdivide the cathode and, particularly, to introduce additional electrode systems into the gas discharge space and/or into the post-acceleration space. The best results have heretofore been achieved with two further control planes in front of the electrode matrix: A second line grid, which, if addressed correctly, keeps the fast electrons from the post-acceleration space and thus reduces, particularly, the cross-talk effect in the columns and, in front thereof, an electrode at a fixed potential which divides the potential in the post-acceleration space in a non-linear manner and reduces the danger of a breakdown note in this connection U.S. Pat. No. 4,322,657 which issued Mar. 30, 1982 and co-pending Application Ser. No. 470,702, filed Feb. 28, 1983, and assigned to the same assignee as that of the instant application. Such a pentode, however, requires a specific expense for manufacturing and adjustment, which becomes ever more critical with decreasing picture element spacing and, in addition, does not yet afford optimum contrast because plasma radiation can reach the display surface, as before.

The described difficulties are circumvented if, as is provided in U.S. Pat. No. 4,236,096 which issued Nov. 25, 1980, the two chambers are separated from one another by a transparent wall, and the flow of the gas discharge is sued to excite a photocathode on the front side of the partition to emit electrons. This concept which is attractive from the theoretical side, has not yet found acceptance in practice, particularly for the reason that the presently available photocathode materials have not yet attained the required conversion efficiency.

Starting from this state of the art, it is an object of the invention to provide a modified two-chamber display of the type described at the introduction to this specification in such a way that it becomes breakdown-proof, no longer has interfering background brightness and can be produced efficiently even if the display is to have high resolution.

With the foregoing and other objects in view, there is provided, in accordance with the invention, a flat electron beam tube comprising: a gas-filled enclosure containing two mutually parallel plates, namely a front plate and a rear plate disposed one behind the other in viewing direction; the enclosure having an interior space subdivided by a control plate extending parallel to the planes of the front and the rear plates, into a front chamber, a post-acceleration space, and a rear chamber defining a gas discharge space; the rear plate carrying at least one cathode on an inner side thereof, the cathode being a gas discharge cathode; the front plate carrying, on an inner side thereof, a luminescent layer excitable by electrons and a post-acceleration anode; the control plate carrying, on a side thereof towards the gas discharge space, a family of mutually parallel strip-shaped row conductors, and being formed with a number of regularly arranged electron inlet openings and, on the side thereof facing towards the post-acceleration space, a family of mutually parallel, strip-shaped column conductors, and being formed with a number of regularly arranged electron outlet openings, the column conductors being disposed crosswise to the row conductors, and the electron outlet openings being associated, respectively, by means of cutouts formed in the control plate, with given electron inlet openings; the row conductors being addressed successively by being connected to a more positive potential relative to the potential of the gas discharge cathode in a manner that an electron-supplying gas discharge burns between the opposite gas discharge cathode and the addressed row conductor; the column conductors being supplied with corresponding signal voltages during the time wherein a given row conductor is addressed; the post-acceleration anode being at a positive potential so high that the electrons traveling from the gas discharge into the post-acceleration space are accelerated to several kV and finally strike the luminescent layer; mutually associated electron inlet openings and electron outlet openings being disposed in non-overlapping relationship in a direction perpendicular to the plane of the front and said rear plates; and the column conductors being always at a potential more negative than that of the row conductor being then addressed.

A control plate constructed in accordance with the invention acts and appears opaque in a plan view because the openings on the one side of the plate are covered up by strips or slats on the other side of the plate; it is therefore clear that this plate does not at any point permit passage of ultraviolet or visible radiation from the plasma. Less obvious is the fact, initially, that the control plate with its curved passage channels also intercepts interfering charge carriers, but is permeable to useful electrons. This discriminator effect which has already been fully confirmed by experiment, can be explained as follows: the useful electrons i.e. the plasma electrons focused to the row just being addressed, are relatively slow. If they enter the control space of the electrode matrix, they are therefore deflected by the deflection fields prevailing ther towards the side (the opposite strip or slat being at sufficiently negative potential), and indeed, for the most part, so far that they come under the influence of the suction effect of the acceleration field extending through the gap openings and are therefore drawn altogether in a curved trajectory into the post-acceleration space. The potential conditions or characteristics may be selected so that only relatively few useful electrodes, which fly through the center of the inlet opening, are intercepted by the strip or slat. This fate, on the other hand, is experienced by the greater part of the fast electrons, the trajectories of which are naturally "stiff" and can be curved rather nonappreciably by the deflection fields. The ions which penetrate into the control space bounce, if they have absorbed relatively much energy, onto the strips or slats on the row side and are otherwise directed, to a greatly predominating extent, onto the strips or slots in the column plane. Only a few of the ions are capable of passing into the gas discharge space; breakdowns therefore do not occur.

The decoupling obtained with the covered control plate is so good that considerable latitude has been regained in the choice of the gas mixture and the gas pressure, as well as in the design of the cathode. A circumstance which is also favorable is that the electron beams entering the post-acceleration space are already focused rather well so that, at most, only simple post-focusing may be required to recombine corresponding partial beams into a single beam having a small cross section. Added to this is that the row openings can be enlarged and the electron yield increased thereby without having to tolerate dangerous voltage penetration. Moreover, it has been found that the display construction proposed herein has a control characteristic which considerably facilitates the maintenance of an overall uniform picture brightness, especially if the gray steps are to be generated by pulse-length modulation: with increasing control voltage, the screen current approaches a plateau which is virtually constant over wide voltage ranges.

Normally, the electron inlet and electron outlet are holes formed in the rows and columns, respectively. Under some circumstances, it may be more advantageous to deviate from this construction and to relocate the openings on the row side or the column side into the spaces between the adjacent conductors. A control structure in which hole-free line conductors (ribbons, wires) alternate with electron inlet gaps of approximately the same width has an additional advantage: the electrons which are drawn from the plasma and fly past the keyed-on row to the left and right are combined (by transverse fields in the inlet gaps) while yet in the control space to form a beam parallel to the rows. If it is decided to place the openings on the column side between the conductors, an electron-optical cylinder lens should be provided in association with each column conductor. Such a lens which, for one, cares for the post-focusing and, for another, shields the individual column conductors from one another, can be realized in an individual case by one or two conductor runs per column conductor parallel to the columns.

In the picture screen according to the invention, a given or known residual brightness is sometimes observed in the picture background. This dark current is caused by the fact that the fast electrons, when striking the column strips or slats, release secondary electrons which penetrate, in part, into the openings on the column side and are then drawn onto the screen. In order to eliminate this effect, as well, the possibility exists of making the column strips or slats wider than the corresponding row openings i.e. to keep the column openings especially narrow. Narrow electron outlet openings, incidentally, have always therefore been desirable if only for the reason that they are a prerequisite for a small beam cross section at the fluorescent screen and therefore for a small light spot. A control plate wherein the openings on the column side and the openings on the row side are not mutually aligned has already become known from German Published Non-Prosecuted Application (DE-)S) No. 30 10 179. This proposal, which is aimed only at facilitating production, is based on the fact, however, that the holes overlap at least partially, so that the detrimental reactions between the two spaces are basically not attenuated at all.

In accordance with another feature of the invention the electron inlet openings are formed by holes in the row conductors, and the electron outlet openings by holes in the column conductors, the electron outlet openings being disposed in offset relationship to the electron inlet openings with which they are associated in direction of extension of the row conductors.

In accordance with a further feature of the invention, the electron outlet openings are formed as slits extending perpendicularly to the direction of the offset.

In accordance with an additional feature of the invention, the electron inlet openings are formed as longitudinal slits between adjacent row conductors, and the electron outlet openings are disposed in offset relationship, in direction of the extension of the column conductors to the electron inlet openings with which they are associated.

In accordance with an added feature of the invention, the electron outlet openings are formed as longitudinal slits located between adjacent column conductors, and the electron outlet openings are disposed offset in direction of the extension of the new conductors relative to the electron outlet openings with which they are associated.

In accordance with yet another feature of the invention, there is provided in vicinity of the side of the control plate facing towards the post-acceleration space, a system of focusing electrodes having a potential negative with respect to the potential of the respective associated column conductor is arranged for focusing the electrons entering the post-acceleration space in a manner like that of an elecrtron-optical cylinder lens.

In accordance with a concomitant feature of the invention, there is provided at least one strip-shaped focusing electrode associated with each column conductor and extending parallel thereto.

Other features which are considered as characteristic for the invention are set forth in the appended claims.

Although the invention is illustrated and described herein as embodied in a flat electron beam tube having a gas discharge as electron source, it is nevertheless not intended to be limited to the details shown, since various modifications and structural changes may be made therein without departing from the spirit of the invention and within the scope and range of equivalents of the claims.

Figure 2:
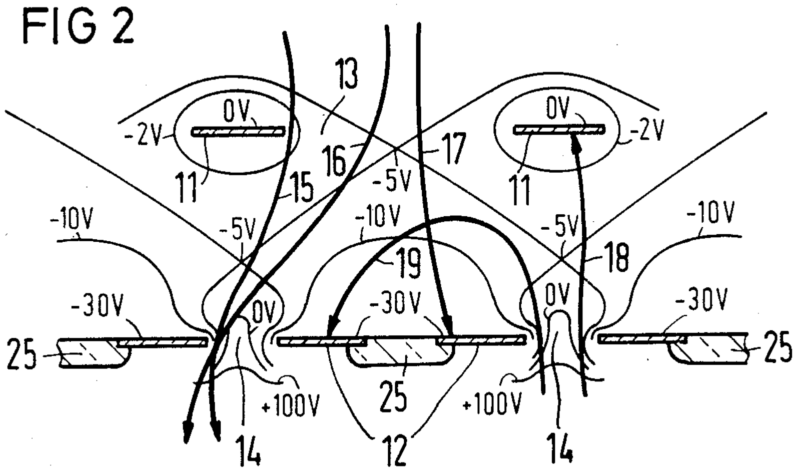

The construction and method of operation of the invention, however, together with additional objects and advantages thereof will be best understood from the following description of specific embodiments when read in connection with the accompanying drawings, in which:

FIG. 1 is a perspective view partly broken-away and partly in section of an embodiment of the flat electron beam tube having a gas discharge as electron source according to the invention; and FIG. 2 is a cross-sectional view of the control plate of FIG. 1 taken along the line II—II, the support structure for the electrode matrix being merely indicated schematically.

In the interest of clarity, the figures, generally, are highly schematic. Parts which are not absolutely necessary for an understanding of the invention, such as electrode leads and spacers, for example, have been omitted altogether.

Referring now more specifically to the drawings and first, particularly, to FIG. 1 thereof, there is shown a flat picture screen containing a gas-filled jacket or shell 1 with a back plate 2 and a front plate 3 and a control plate 4. All three plates lie in mutually parallel planes, the control plate subdividing the interior of the jacket or shell 1 into two spaces, a forward post-acceleration space 5 and a rear gas discharge space.

The back plate 2 is provided on the front side thereof with a family of mutually parallel cathode strips 7 of relatively large area. The front plate 3 supports, on the rear side thereof, a regular raster of phosphorus dots 8 which can be excited to light emission by electrons and, on the top thereof, a post-acceleration anode 9. The control plate 4, which is braced against the front plate 3 by a spacer frame 10, is provided on the rear side thereof with a family of mutually parallel row conductors 11 and on the front side thereof with column conductors 12. The row conductors 11 extend parallel to the cathode strips 7, and the column conductors 12 extend perpendicularly thereto. Openings are formed in each of the conductors 11 and 12, namely electron inlet openings 13 in the row conductors 11 and electron outlet openings 14 in the column conductors 12. During operation of the display, the following voltages are applied to the individual electrodes: 200 volts and 0 volts, respectively, to the selected and non-selected cathode strips 7; 0 volts and −50 volts, respectively, to the keyed and no-keyed line conductors 11; between −80 volts and −30 volts to the column conductors 12; and +4 kV to the post-acceleration anode 9. The electrode matrix is addressed line-by-line, row-by-row sequentially, and the cathode voltages are synchronized with the line or row scanning voltage in such a manner that the plasma burns, respectively, between the selected row conductor and the cathode strip which happens to be opposite it. Further details of this addressing principle follow from German Publishes Non-Prosecuted Application (DE-OS) No. 26 43 915. Moreover, reference is made to the previously cited U.S. Pat. No. 3,956,667 which, among other things, is also concerned in detail with questions of mechanical construction.

It is apparent from FIG. 2 that the control plate 4 acts like a continuous plate when viewed perpendicularly to the planar extension thereof, because the openings on the one side thereof are covered-up by solid blinds or shutters on the other side thereof. (In FIG. 2, in essence only the conductor part of the entire plate 4 is illustrated; of the conductor-carrying structure formed of insulating material, only column supports 25 which close the gaps between the column conductors are indicated). Such a covering is effected if the following dimensions are selected: the row conductors 11 are 340 μm wide and are spaced 60 μm from one another. The electron inlet openings 13 are rectangles with an area of 220×200 μm, the narrow sides of the rectangles being parallel to the extension of the row conductors, furthermore, the rectangles are spaced 200 μm from one another. The column conductors are 340 μm wide, have a spacing likewise of 60 μm from one another and have slit-shaped electron outlet openings 14. These slits, which are parallel to the column conductors, are 300

μm long, 80 μm wide and are placed, respectively, behind one of the row conductor strips which remain between adjacent electron inlet openings.

The control plate 4 which is shown in FIG. 1 as an unstructured block in the interest of simplicity, should be constructed in practice so that it can, on the one hand, function as a stable support for the row and column conductors and, on the other hand, contain electron passage channels which connect the mutually associated electron openings to one another. The production of such a support structure presents no fundamental difficulties in practice because one may fall back on techniques which have already been developed for control discs with rectilinear cutouts. Thus, the row and column conductors could be formed first on a thin glass foil and the glass could then be etched away through the conductor openings down to relatively small-area connecting points between the two families of conductors. A second possibility is to realize the row and column conductors on separate support systems initially and, thereafter, to assemble these units in mutually correct position. As a rule, the support systems will contain mutually parallel insulating strips which are positioned, respectively, between two adjacent conductors and are optionally supplemented by a few transverse struts to form a self-supporting structure.

FIG. 2 shows the potential relationships in the vicinity of the electrode matrix and, specifically, for the case wherein the row conductor is selected and the column conductors are at passing potential. If the row conductor voltage is selected as the reference potential, the column conductors are at −30 volts. If the influences from the gas discharge space on the one hand and the post-acceleration space, on the other hand, are further added, a potential distribution is obtained, several characteristic equipotential surfaces of which are shown in the diagram of FIG. 2 and are provided therein with the corresponding potential values. Two saddle points of −5 volts, one approximately in the center of the electron beam inlet opening and another one above the electron outlet opening, are shown. According to the laws of electron optics,, the saddle point located on the row conductor side and having a potential more positive than the potential surface generating it, acts divergent for electrons and focusing for ions, whereas the saddle point located above the column opening and formed by a potential surface with more positive potential, focuses the electrons and scatters the ions. These two lens effects change, in a characteristic manner, the trajectories of the charge carriers entering the control space. In order to illustrate this, representative trajectories of the electrons (curves 15, 16 and 17) and of ions (curves 18 and 19) have been introduced into the figure. The curves 15 and 16 belong to slow electrons from the gas discharge; curve 17 designates the trajectory of a fast plasma electron; and the curves 18 and 19 describe the paths, respectively, of a fast and a braked-down ion from the post-acceleration space. It is apparent that the low-energy electrons are drawn through the control space on a curved trajectory and enter the post-acceleration space as a relatively well-focused beam. The slow electrons are initially scattered and, then, under the influence of a continuously pulling field, advanced to the inner side of the column conductors. The fast electrons and ions are deflected only slightly by the relatively weak fields; they impinge upon the parts of the control structure acting as shutters or blinds and are thereby rendered largely harmless.

The invention is, of course, not confined to the illustrated embodiment. Thus, there is available, in particular, considerable latitude yet in the design of a control plate because in essence, it matters only that the openings on both sides of the control plate be set staggered with respect to one another. For example, the openings of the even-numbered row conductors could be offset relative to the openings of the odd-numbered line conductors, and the column conductors could correspondingly be made to extend in zig-zag fashion (note in this connection also German Pat. No. 26 15 569). Apart from this, it would also be possible to employ the elements optionally used for post-focusing simultaneously also for stiffening or bracing the control structure; thus, it is advisable, for example, in cases wherein each column conductor is flanked by one or two additional conductors, to place these intermediate electrodes as parallel strips on the front side of an insulating stack and to fix the rod on the rear side thereof with two respectively adjacent column conductors. The foregoing is a description corresponding, in substance, to German application No. P 32 22 850.3, dated June 18, 1982, international priority of which is being claimed for the instant application, and which is hereby made part of this application. Any material discrepancies between the foregoing specification and the specification of the aforementioned corresponding German application are to be resolved in favor of the latter.

There are claimed:

1. Flat electron beam tube comprising:

(a) a gas-filled enclosure defined by two mutually parallel plates, namely a front plate and a rear plate disposed one behind the other in viewing direction;

(b) said enclosure having an interior space subdivided by a control plate extending parallel to the planes of said front and said rear plates, into a front chamber defining a post-acceleration space, and a rear chamber defining a gas discharge space;

(c) said rear plate carrying at least one cathode on an inner side thereof, said cathode being a gas discharge cathode;

(d) said front plate carrying, on an inner side, thereof, a luminescent layer excitable by electrons, and a post-acceleration anode;

(e) said control plate being formed with a plurality of regularly arranged electron inlet openings on a side thereof facing towards said gas discharge space;

(f) said control plate carrying on said side thereof facing towards said gas discharge space, a family of mutually parallel strip-shaped row conductors, via which an introduction of electrons into said electron inlet openings is controllable by an application of given voltages;

(g) said control plate being formed with a plurality of regularly arranged electron outlet openings on a side thereof facing towards said post-acceleration space;

(h) said control plate carrying on said side thereof facing towards said post-acceleration space, a family of mutually parallel, strip-shaped column conductors, extending perpendicularly to said row conductors and via which a discharge of electrons out of said electron outlet openings is controllable by an application of given voltages;

(i) said control plate being formed with through-outputs connecting said electron outlet openings with said electron inlet openings so as to form passages for electrons from said gas discharge space;

(j) said row conductors being connected to a first voltage source which, when one of said row conductors is addressed, delivers a more positive potential relative to the potential of said gas discharge cathode in a manner that an electron-supplying gas discharge burns between the gas discharge cathode and the addressed row conductors;

(k) said column conductors being connected to a second voltage source which, during the time wherein a given row conductor is addressed, supplies corresponding signal voltages;

(l) said post-acceleration anode being connected to a third voltage source applying a positive potential to said post-acceleration anode which is so high that the electrons traveling from said gas discharge into said post-acceleration space are accelerated to several kV and finally strike said luminescent layer;

(m) mutually associated electron inlet openings and electron outlet openings being disposed in non-overlapping relationship in a direction perpendicular to the plane of said front and said rear plates; and (n) said second voltage source applying a potential to said column conductors which is always lower than that of said row conductor being then addressed.

2. Electron beam tube according to claim 1, wherein said electron inlet openings are formed by holes in said row conductors, and said electron outlet openings by holes in said column conductors, said electron outlet openings being disposed in offset relationship to the electron inlet openings with which they are associated in direction of extension of said row conductors.

3. Electron beam tube according to claim 2, wherein said electron outlet openings are formed as slits extending perpendicularly to the direction of said offset.

4. Electron beam tube according to claim 1, wherein said electron inlet openings are formed as longitudinal slits between adjacent row conductors, and said electron outlet openings are disposed in offset relationship, in direction of the extension of said column conductors, to the electron inlet openings with which they are associated.

5. Electron beam tube according to claim 1, wherein said electron outlet openings are formed as longitudinal slits located between adjacent column conductors, and said electron outlet openings are disposed offset in direction of the extension of said row conductors relative to said electron outlet openings with which they are associated.

6. Electron beam tube according to claim 1, wherein, in vicinity of said side of said control plate facing towards said post-acceleration space, a system of focussing electrodes having a potential negative with respect to the potential of the respective associated column conductor is arranged for focussing the electrons entering said post-acceleration space in a manner like that of an electron-optical cylinder lens.

7. Electron beam tube according to claim 6, including at least one strip-shaped focussing electrode associated with each column conductor and extending parallel thereto.

* * * * *